Patented July 4, 1939

2,164,355

UNITED STATES PATENT OFFICE 2,164,355

ESTERS OF 1,4-DIOXANEDIOL-2,3 AND 1,4-DIOXANEOL-2-CHLORO-3

Harold R. Slagh, Midland, Mich., assignor to The Dow Chemical Company, Midland, Mich., a corporation of Michigan No Drawing. Application August 28, 1937, Serial No. 161,468

7 Claims. (Cl. 260—338)

This invention concerns carboxylic acid esters of 1,4-dioxanediol-2,3 and 1,4-dioxaneol-2-chloro-3 and a method for preparing the same.

Esters of 1,4-dioxanediol-2,3 have heretofore been prepared by heating a mixture of 2,3-dichloro-dioxane-1,4 with the alkali metal salts of organic acids, filtering off the alkali metal chlorides formed in the reaction and thereafter recovering the desired products as by fractional distillation. This reaction results in the formation of substantial quantities of tarry by-products and in the formation of the desired ester derivatives in relatively small amount. Böeseken, Tellegen, and Henriquez, J. A. C. S. 55, 1284 (1933) describe the preparation of the di-acetate of dioxanediol according to this method and further state that 2,3-dichlorodioxane-1,4 cannot be reacted with free acids such as acetic acid to obtain the desired ester products.

I have discovered that monocarboxylic acids react with 2,3-dichlorodioxane-1,4 to form valuable ester compounds according to the following equations:

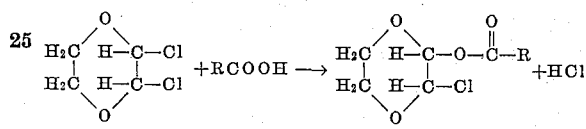

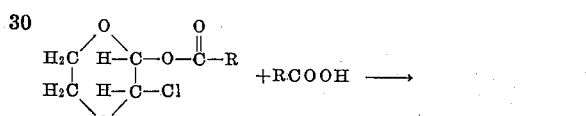

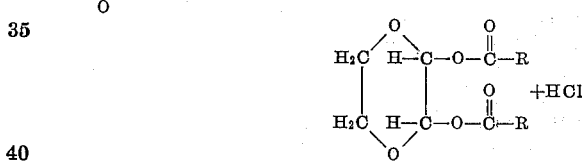

wherein each R represents an organic residue. The aliphatic araliphatic, and aromatic carboxylic acids have all been found suitable for use in this esterification reaction. Saturated and unsaturated acids have been employed as well as monocyclic and polycyclic acids containing both homocylic and heterocyclic ring structures. The expression "mono-carboxylic acids" as hereinafter employed includes acids containing unreactive substitutents such as the bromo, chloro, nitro, alkyloxy, aryloxy, and acyl groups in addition to the carboxyl.

While the mono-carboxylic acid and dichlorodioxane can be reacted together in varying proportions, I generally employ from about 0.5 to about 2.25 molecular equivalents of acid for each mole of disclorodioxane. A mixture of di-esters of 1,4-dioxanediol-2,3 and mono-esters of 1,4-dioxaneol-2-chloro-3 is generally formed, the di-ester being formed in increasing proportion as the ratio of acid to dichlorodioxane in the reaction mixture increases. In carrying out the reaction, the acid and dichlorodioxane are mixed together and warmed to a temperature at which hydrogen chloride is evolved from the mixture. Following completion of the reaction, the crude reaction mixture is treated to recover the ester product.

The preferred reaction temperature varies with the particular acid employed, but is generally between about 100° C. and the decomposition temperature of the reaction mixture, although somewhat lower temperatures may be employed. While not essential, it is preferable that the reactants be dissolved in an inert solvent, such as benzene, chloro-benzene, toluene, xylene, etc., and the reaction carried out by heating the mixture at its refluxing temperature. The time required for carrying out the reaction is dependent upon the reaction temperature employed and upon whether a mono-or di-ester compound is desired as the major product of reaction.

The methods by which the ester products are isolated from the crude reaction mixture vary with the particular compounds concerned. For example, in isolating the ester derivatives of low boiling and stable acids, the crude reaction product may be fractionally distilled under reduced pressure. Where high boiling or unstable acids are employed in the reaction, the crude mixture resulting therefrom may be partially distilled under reduced pressure to recover low boiling products of reaction and unreacted acid and dichlorodioxane, and subsequently fractionally crystallized, clarified with activated carbon, or selectively extracted with solvents adapted to effect separation between the desired ester derivatives and residual reactants present therein. When the ester product formed is insoluble a preliminary separation may be accomplished by filtration of the reaction mixture.

The products obtained by reacting different monocarboxylic acids with 2,3-dichlorodioxane-1,4 vary widely in characteristics from stable crystalline substances of definite melting point to unstable, viscous liquids which decompose on distillation and have the characteristic of rapid polymerization upon exposure to air and light. These compounds have been found useful for a number of purposes, e. g. as plasticizers, insecticidal agents, intermediates, etc.

The following examples set forth the characteristics and method of preparation for certain representative members of this class of compounds, but are not to be construed as limiting the invention.

Example 1

A mixture of 79 grams (0.5 mole) of 2,3-dichlorodioxane-1,4, 100 grams (1.14 moles) of normal butyric acid, and 100 milliliters of toluene was heated under reflux at a temperature of 127° C. for 10.5 hours. The reaction mixture was then cooled and fractionally distilled under reduced pressure to recover first toluene, residual butyric acid, and dichlorodioxane and low boiling ester products, after which 71.5 grams of a dibutyrate of dioxanediol fraction was distilled, this material freezing at 62° C. and having a boiling point of 158° C. at 0.15 inch pressure. When recrystallized out of petroleum ether, the di-normal-butyrate of 1,4-dioxanediol-2,3 is a white crystalline compound melting at 75° C.

Example 2

79 grams (0.5 mole) of 2,3-dichlorodioxane-1,4, 282 grams (1 mole) of oleic acid, and 50 milliliters of xylene were heated together at the refluxing temperature of the mixture for 14 hours at temperatures gradually increasing from 161° to 190° C. The reaction mixture was cooled and xylene and residual reactants were removed by distillation under reduced pressure up to a temperature of 205° C. at 0.1 inch pressure. The residue consisted of 288 grams of a di-oleate of 1,4-dioxanediol-2,3 product as a dark, syrupy liquid having a specific gravity of 0.904 at 20°/4° C. This product decomposed on attempted distillation under reduced pressure.

Example 3

213 grams (0.75 mole) of stearic acid and 59.3 grams (0.375 mole) of 2,3-dichlorodioxane-1,4 were mixed with 150 milliliters of xylene, and the resulting solution refluxed for 25 hours at 152°–156° C. The reacted mixture was thereafter cooled, and the xylene, low boiling reaction products, and residual dichlorodioxane and stearic acid removed by distillation up to 250° C. at 0.1 inch pressure. 175 grams of solid residue obtained from the distillation consisted essentially of the di-stearate product. Upon recrystallization from ethyl alcohol, there was obtained substantially pure di-stearate of 1,4-dioxanediol-2,3 as white crystals melting at 84° C.

Example 4

122 grams (1 mole) of benzoic acid, 79 grams (0.5 mole) of 2,3-dichlorodioxane-1,4, and 100 milliliters of toluene were mixed together and reacted substantially as described in Example 1. After 13 hours of heating, the reacted mixture was fractionally distilled, whereby there was obtained 54 grams of a di-benzoate of 1,4-dioxanediol-2,3 product as a yellow-tinged liquid boiling at approximately 205° C. at 0.15 inch pressure.

Example 5

A mixture of 148 grams (1 mole) of cinnamic acid, 79 grams (0.5 mole) of 2,3-dichlorodioxane-1,4, and 100 milliliters of toluene was refluxed at 128° C. for 16 hours. The reaction product was cooled, and the toluene, low boiling reaction products, and residual reactants recovered by distillation under vacuum. 199 grams of a di-cinnamate product was obtained as a solid residue. This product was broken up, extracted with ether, filtered, and washed, yielding 121 grams of white crystals melting at 192° C. Upon recrystallization from benzene there was obtained white, fluffy crystals of the di-cinnamate of 1,4-dioxanediol-2,3 melting at 193° C. This compound is substantially odorless and relatively insoluble in most common organic solvents.

Example 6

86 grams (1 mole) of beta-methylacrylic acid, 79 grams (0.5 mole) of 2,3-dichlorodioxane-1,4, and 100 milliliters of xylene were mixed together and refluxed at temperatures gradually increasing from 140° to 150° C. for 14 hours. The xylene was thereafter distilled from the reacted product under reduced pressure, whereby the desired ester product was obtained as a viscous insoluble residue. This product, on boiling with ethyl alcohol, became gelatinous. The ethyl alcohol dispersion was cooled and filtered to obtain a residue of a di-(methylacrylate) of 1,4-dioxanediol-2,3 product as a spongy, brittle, resinous material substantially insoluble in most common organic solvents, and having a pleasant fruity odor.

Example 7

112 grams (1 mole) of furoic acid, 79 grams (0.5 mole) of 2,3-dichlorodioxane-1,4, and 100 milliliters of xylene were mixed together and refluxed at a temperature of 140°–144° C. for 13 hours. Fractional distillation of the reacted mixture resulted in the recovery of the xylene and unreacted portions of the furoic acid and dichlorodioxane, and in the isolation of 59 grams of the di-furoate of 1,4-dioxanediol-2,3 boiling at 174°–183° C. at 0.25 inch pressure. Upon recrystallization from ethyl alcohol this latter fraction yielded white crystals melting at 73° C. and having a pleasant ester odor.

Example 8

79 grams (0.5 mole) of 2,3-dichlorodioxane-1,4, 190 grams (1 mole) of coumarin-carboxylic acid having the formula

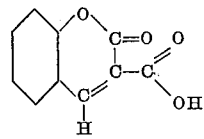

and 100 milliliters of xylene were refluxed together at 146°–154° C. for 11.5 hours. The reaction product was then cooled, filtered to remove xylene and residual reactants, and washed with xylene and ether. The residue, consisting of 147 grams of crude di-ester product, was very insoluble in most organic solvents and melted at 239°–243° C. A small amount of this product was recrystallized from epichlorohydrin to obtain the di-(coumarin-carboxylate) of 1,4-dioxanediol-2,3 as fine, tan colored crystals having a sweetish ester odor, and melting at 255° C.

In a similar manner, other mono-carboxylic acids were reacted with 2,3-dichlorodioxane-1,4, examples of the products so obtained being:

Di-acetate of 1,4-dioxanediol-2,3 as a solid compound boiling at 137° C. at 0.15 inch pressure and having a melting point of 79° C.

Di-propionate of 1,4-dioxanediol-2,3 as a water-white liquid having a specific gravity of 1.182 at 25°/4° C.

Monopropionate of 1,4-dioxaneol-2-chloro-3 as a water-white liquid boiling between 112° and 115° C. at 0.15 inch pressure and having a specific gravity of 1.271 at 25°/4° C.

Di-(isovalerate) of 1,4-dioxanediol-2,3 as a solid product boiling between 165° and 171° C. at 0.15 inch pressure and having a melting point of 79° C. when crystallized from petroleum ether. This compound has a sharp, obnoxious odor and is relatively soluble in most common organic solvents.

Di-crotonate of 1,4-dioxanediol-2,3 as a semi-solid product boiling at 169° C. at 0.1 inch pressure. This product is relatively soluble in most common organic solvents, and upon re-crystallization melts at 61° C.

Di-(4-nitro-benzoate) of 1,4-dioxanediol-2,3 as fine yellow crystals melting at 207° C. and having a sharp odor.

Di-(4-chloro-benzoate) of 1,4-dioxanediol-2,3 as a fine, white crystalline product melting at 174° C. and having a faint ester odor.

Di-myristate of 1,4-dioxanediol-2,3 as a fine, white crystalline product melting at 86.5° C.

Other acids which may be reacted with 2,3-dichloro-dioxane-1,4 in a manner analogous with that described in the foregoing examples include the following: isobutyric acid, normal pentanoic acid, caproic acid, caprylic acid, lauric acid, myristic acid, alpha-bromo-butyric acid, nitro-butyric acid, palmitic acid, palmitolic acid, alpha-bromo-cinnamic acid, para-nitro-cinnamic acid, 2-chloro-benzoic acid, 3,5-dinitro-benzoic acid, naphthoic acid, campholic acid, nitro-pyromucic acid, alpha-chloro-crotonic acid, beta-bromo-crotonic acid, phenyl-acetic acid, phenoxy-acetic acid, 2,4-dichloro-phenyl-acrylic acid, and phenyl butyric acid. Mixtures of the above and similar mono-carboxylic acids may be reacted with 2,3-dichlorodioxane-1,4 to obtain di-ester products in which the esterifying groups are not identical. Similarly, mono-esters of 2-chloro-dioxanediol-3 can be reacted with the mono-carboxylic acids to give mixed di-esters of dioxane. If desired the crude products obtained in the above examples may be employed for various purposes without isolating individual ester compounds therefrom.

The new compounds with which this application is particularly concerned are those di-ester products having the following formula

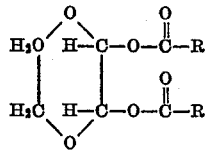

wherein each R represents an alkyl radical containing at least 4 carbon atoms.

Other modes of applying the principle of my invention may be employed instead of those explained, change being made as regards the method or compounds herein disclosed, provided the steps or compounds stated by any of the following claims, or the equivalent of such steps or compounds, be employed.

I therefore particularly point out and distinctly claim as my invention:

1. The process which comprises the step of heating 2,3-dichlorodioxane-1,4 with a mono-carboxylic acid to a temperature and under such conditions that hydrogen chloride gas is evolved from the reaction mixture, but below the decomposition temperature of the reaction mixture to produce esters of 1,4-dioxanediol-2,3 and 1,4-dioxaneol-2-chloro-3.

2. The process which comprises the step of heating a mixture of 2,3-dichlorodioxane-1,4, a mono-carboxylic acid, and an inert solvent selected from the class consisting of benzene and the homologues thereof to a temperature and under such conditions that hydrogen chloride gas is evolved from the mixture, but below the decomposition temperature of the reaction mixture.

3. The process which comprises the steps of heating a mixture of 2,3-dichlorodioxane-1,4, a mono-carboxylic acid, and an inert solvent selected from the class consisting of benzene and the homologues thereof to a temperature and under such conditions that hydrogen chloride gas is evolved from the mixture, but below the decomposition temperature of the reaction mixture, and thereafter isolating the ester products of reaction from the reaction mixture.

4. Di-esters of 1,4-dioxanediol-2,3 having the formula

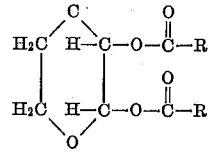

wherein each R represents an alkyl radical containing from 4 to 17 carbon atoms, inclusive.

5. The di-(isovalerate) of 1,4-dioxanediol-2,3.

6. The di-stearate of 1,4-dioxanediol-2,3.

7. Di-esters of 1,4-dioxanediol-2,3 having the formula

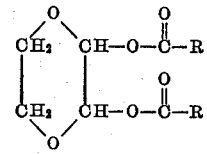

wherein each R represents a member of the group consisting of the butyl, pentyl, heptyl, undecyl, tridecyl, pentadecyl, and heptadecyl radicals.

HAROLD R. SLAGH.